Dec. 22, 1964  J. T. TOMAN  3,162,094
FLUID ACTUATED RECIPROCATING MECHANISM AND CONTROLS THEREFOR
Filed Jan. 8, 1962  3 Sheets-Sheet 1

WITNESS
NORMAN G. TRAVISS

INVENTOR
JAMES T. TOMAN
BY Talbert Dick & Earley
ATTORNEYS

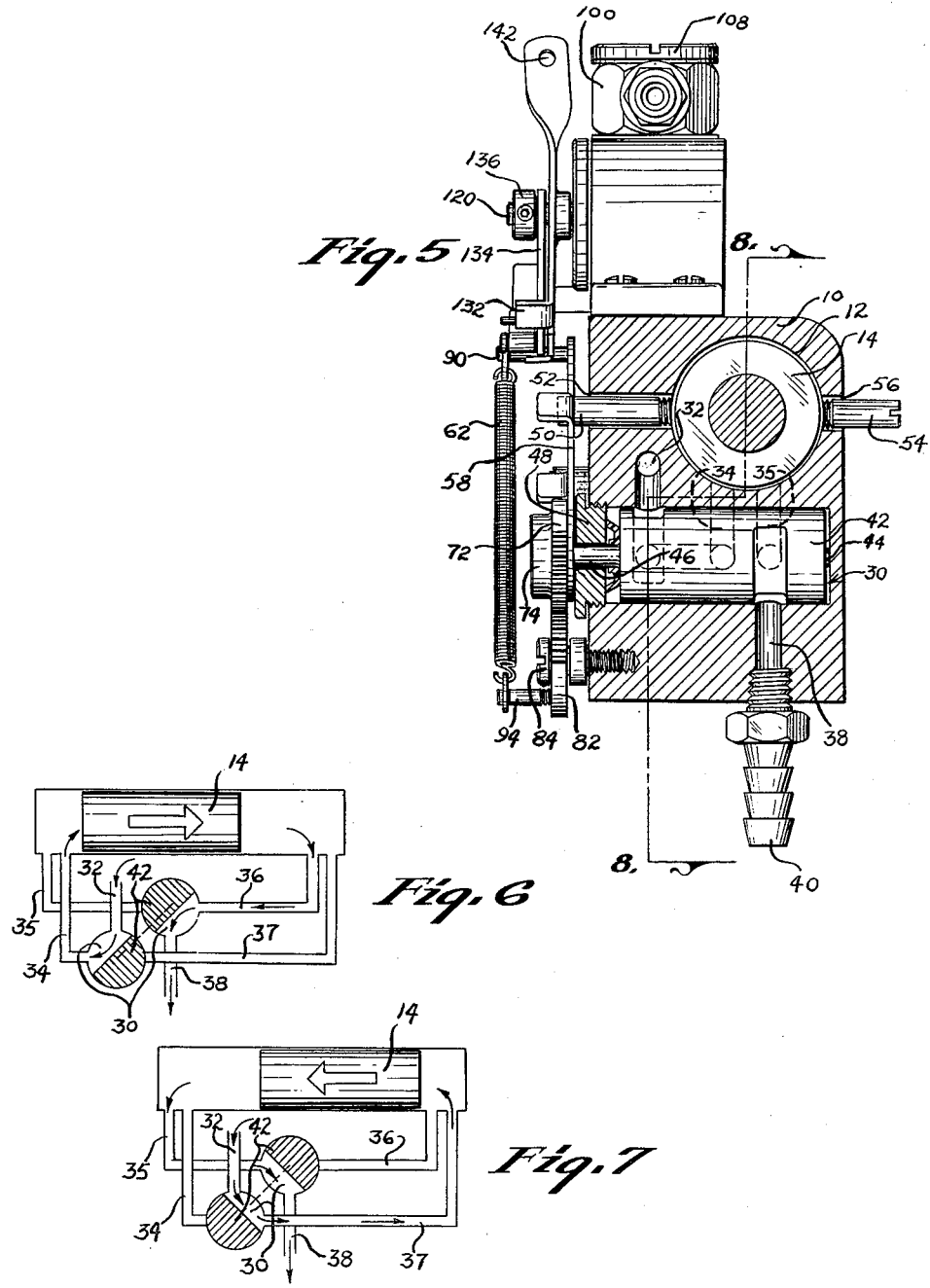

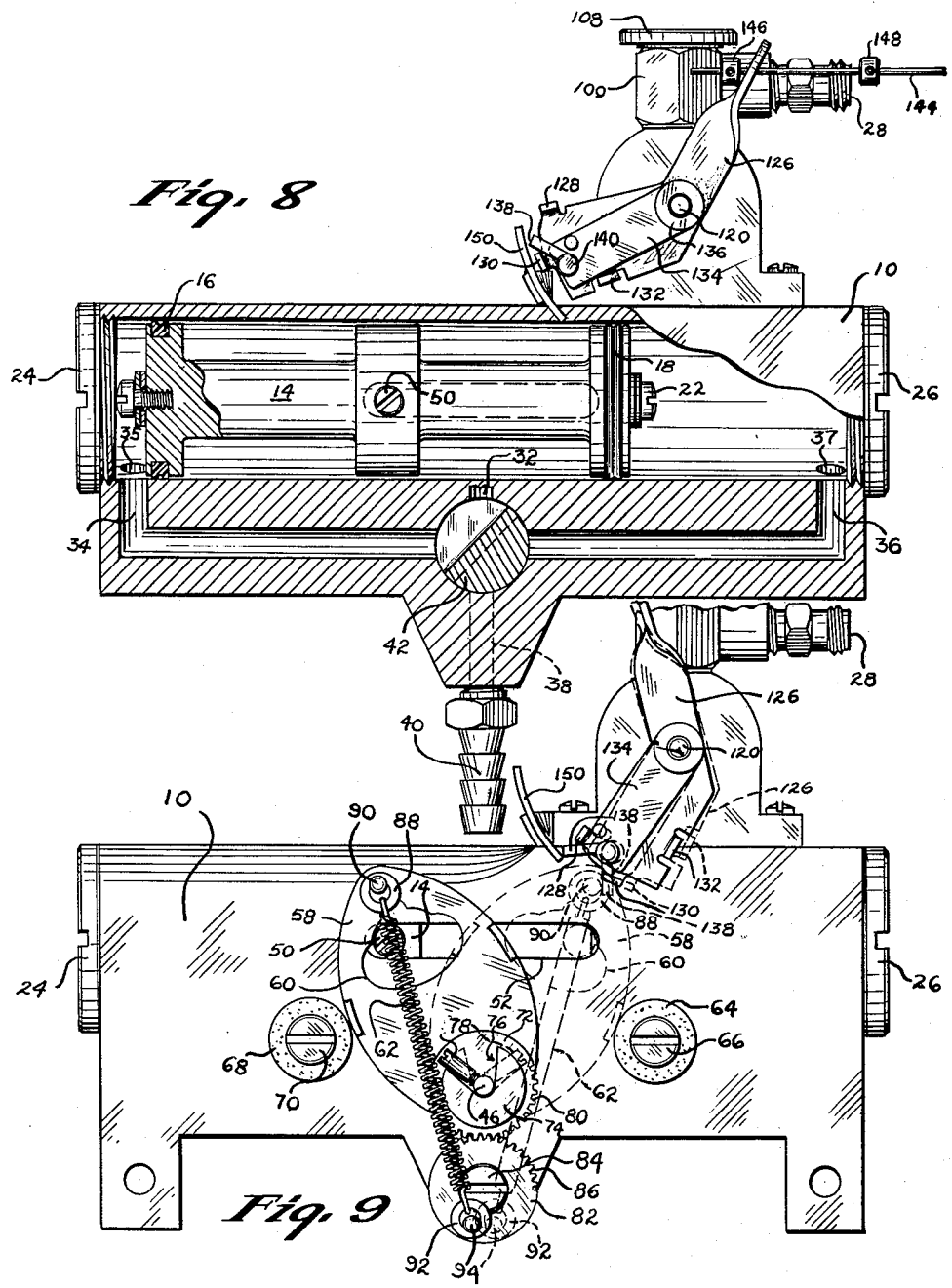

United States Patent Office 3,162,094
Patented Dec. 22, 1964

3,162,094
FLUID ACTUATED RECIPROCATING MECHANISM AND CONTROLS THEREFOR
James T. Toman, 7705 Palm Drive, Des Moines, Iowa, assignor of one-half to David H. Lipsey, Des Moines, Iowa
Filed Jan. 8, 1962, Ser. No. 164,825
5 Claims. (Cl. 91—335)

This invention relates to novel reciprocating mechanisms actuated by fluid pressure and having controls governing the motion thereof. In a more specific aspect the present invention relates to a device capable of supplying reciprocating motion under the impulse of a fluid under pressure which includes manually operable means to control the rate of flow of said fluid.

One use for which the invention is especially well suited is that of supplying motion to reciprocating members such as vehicle windshield wipers and the like. Although the invention will be described in connection with such members it is to be understood that its use is not limited solely to this application.

It is desirable that the movement of vehicle windshield wipers be adjustable between several predetermined speeds, or continuously adjustable between a predetermined maximum speed and the "off" position, or zero speed. It is also desirable that the wiper blades be returned to an initial position when turned off by the usual manual switch regardless of their position at the time the switch is moved to the "off" position by the operator. In windshield wipers wherein a fluid under pressure is pumped into a cylinder to cause movement of a piston the flow of the fluid is normally controlled by a valve interposed at a convenient location in the line through which the fluid is supplied. When the valve is closed, the fluid ceases to flow to the piston supplying motion to the wiper stops. Obviously the wiper blades will not be returned to their initial position when the piston stops if the valve is closed when the blades are at other than their initial position.

It is a principal object of the present invention to provide novel apparatus for supplying reciprocating motion under fluid pressure in combination with means for selectively controlling said motion.

Another object is the provision of novel control means for fluid actuated mechanisms.

A further object is to provide a fluid actuated reciprocating mechanism having control means allowing continuous adjustment of the speed of reciprocating motion and causing the mechanism to stop at a predetermined position irrespective of its position at the time the control means are moved to the "off" position.

Other objects are: to provide apparatus movable under the impulse of a fluid under pressure and having manually operable control means movable to an open position to cause motion of said apparatus and movable to a fully closed position to stop the motion of said apparatus by contact of a portion of the apparatus with a portion of the control means subsequent to an initial manual movement of the control means by the operator; to provide novel cam-actuated control means for hydraulic apparatus; to provide apparatus reciprocally movable under fluid pressure and having control means comprising a manually operable cam for opening and closing a valve and including means for causing the apparatus to stop automatically at a predetermined position of the parts thereof; and, to provide apparatus of the aforementioned type which is simple in construction, economical in manufacture, and reliable and durable in use.

Other objects will in part be obvious and in part appear hereinafter. The invention accordingly comprises the apparatus having the construction, arrangement and combination of elements set forth in the following detailed disclosure, taken in connection with the accompanying drawings, wherein:

FIG. 5 is an enlarged side elevational view of the apparatus of FIG. 1, in vertical section on the line 5—5 of FIG. 1;

FIGS. 6 and 7 are diagrammatic views showing the manner of operation of the valve system operating the movable piston;

FIG. 8 is an enlarged front view of the apparatus of FIG. 1 partly in vertical section on the line 8—8 of FIG. 5; and, FIG. 9 is a front elevational view of the apparatus showing some parts in a different position from that of FIG. 8.

Figures 1, 2, 3, 4:
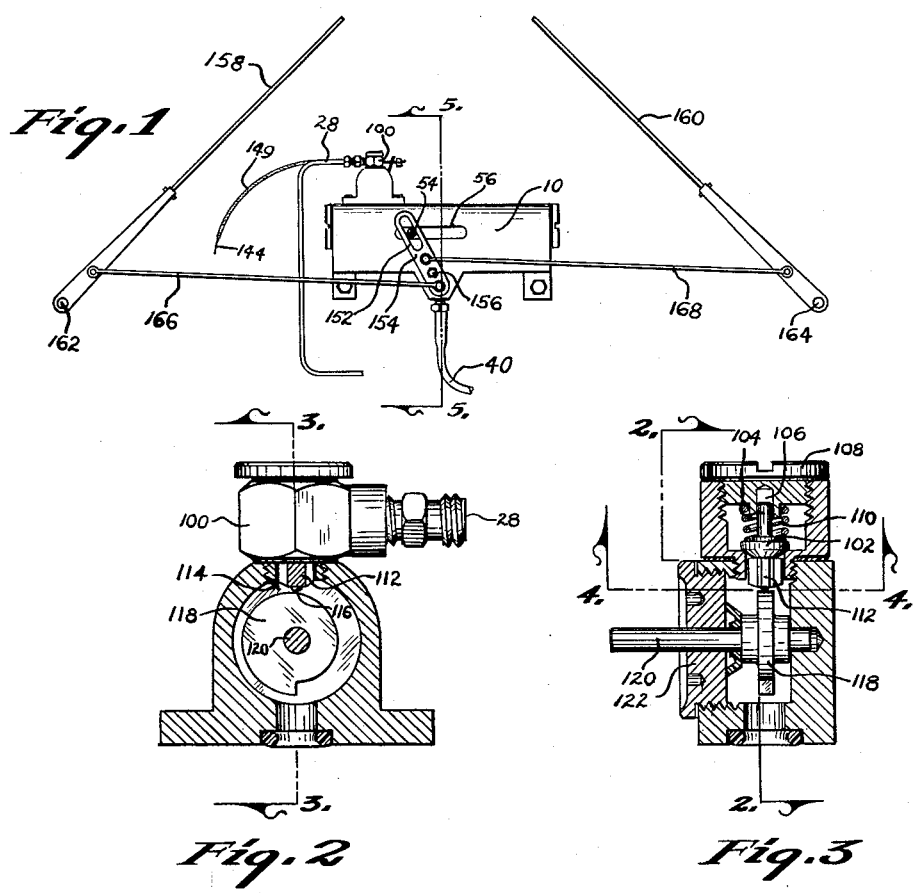
FIG. 1 is a rear elevational view of a preferred embodiment of the present invention showing the device actuating the arms of two vehicle windshield wipers.
FIG. 2 is an enlarged view of a portion of the apparatus of FIG. 1, partially in vertical section on the line 2—2 of FIG. 3.
FIG. 3 is a side elevational view in vertical section on the line 3—3 of FIG. 2.
FIG. 4 is a bottom view in horizontal section on the line 4—4 of FIG. 3.

Many of the elements of the reciprocably movable portion of the invention are similar to those shown in U.S. Patent 2,945,480 issued July 19, 1960, to the present applicant for "Fluid Pressure Actuated Reciprocating Mechanism," of which the present invention is a further extension and improvement.

Referring now to the drawings, wherein like numerals denote like elements throughout the several views, the mechanism is generally supported by and partly contained within base 10. Extending longitudinally through an upper portion of base 10 is a hollow cylinder or bore 12. Freely movable within bore 12 is a piston 14 supported at its ends by gaskets 16 and 18 which also act as fluid seals. The motion of piston 14 is limited by screws 20 and 22 in each of its ends contacting the inner sides of end caps 24 and 26 which are threaded into each end of bore 12 to form a fluid-tight seal.

A fluid, which may be either a liquid or a gas, is alternately supplied to the ends of bore 12 to cause movement of piston 14. The fluid is supplied under pressure from a convenient source, such as the usual oil reservoir or air compression line of a vehicle, and enters housing 10 through an inlet line 28. After passing through a valve arrangement, to be described later, the fluid is introduced into a hollow chamber 30 communicating with inlet line 28 by means of inlet passageway 32 in base 10. Chamber 30 communicates with one end of bore 12 by passageways 34 and 35 in base 10, and with the other end of bore 12 by passageways 36 and 37 in base 10. An outlet passageway 38 in base 10 leads from chamber 30 to an outlet line 40. A generally cylindrical valve member 42 is rotatably mounted within chamber 30 by a bearing member 44 on one of its ends and a shaft 46 on the other. Shaft 46 extends from valve member 42 through cap 48 which is threaded into base 10 to seal the end of chamber 30.

A shaft 50 extends from a central portion of piston 14 through a slot 52 in base 10 substantially parallel with the longitudinal axis of bore 12. A second shaft 54 extends from the opposite side of piston 14 through a second slot 56 in base 10, slot 56 being of like configuration and substantially parallel with slot 52. Reciprocably movable arm 58 is rotatably mounted on shaft 46. Arm 58 has an irregularly shaped opening 60 therein, through which shaft 50 extends. As best seen in FIG. 9, as piston 14 is moved from left to right shaft 50 will contact one side of opening 60 after piston 14 has been moved a short distance. Further movement of piston 14 causes shaft 50 to move arm 58 about its pivotal mounting on shaft 46. As arm 58 passes the central position of its movement it is biased by spring 62 immediately into the position indicated by dotted lines in FIG. 9. The movement of arm 58 is limited at one end of its travel by stop 64, preferably of a material such as rubber to provide a more resilient stop and to reduce noise, mounted on base 10 by any convenient means such as screw 66. The movement of arm 58 is likewise limited at the opposite end of its travel by stop 68 mounted on base 10 by screw 70. It should be noted that opening 60 is large enough and of such configuration that as arm 58 passes its central position, with shaft 50 in contact with the right side of opening 60 as viewed in FIG. 9, and is moved quickly into contact with stop 64, the left side of opening 60 does not contact shaft 50.

Fixedly attached to the forward side of arm 58 for rotation therewith is circular member 72 having a raised portion 74 thereon. A V-shaped notch 76 is cut radially in raised portion 74. Within notch 76 are the end of shaft 46 and an arm 78 extending radially therefrom. As arm 58 is reciprocally rotated by the action of shaft 50 and spring 62, arm 78 and shaft 46 will be rotated in like manner.

A portion of the periphery of circular member 72 is toothed to form gear segment 80. Circular member 82 is rotatably mounted on screw 84 and has a gear segment 86 which meshes with gear segment 80. Thus, rotation of arm 58 causes rotation of circular member 82 in the opposite direction. Spring 62 is mounted at one end of washer 88 which loosely engages a pin 90 on arm 58. The other end of spring 62 is mounted on washer 92 which engages pin 94 on circular member 82. Both ends of spring 62 are thus moved by rotation of arm 58 which has the effect of moving the axis of the coil of spring 62 linearly as well as pivotally, thus causing the toggle action of spring 62 to move arm 58 even more quickly through the latter part of its travel.

The operation of valve member 42 may be seen by reference to diagrammatic FIGS. 6 and 7 wherein the opposite ends of valve member 42 are shown separately. Valve member 42 is substantially cylindrical in form, having notches or cut-away portions in predetermined areas thereof. The configuration of these portions is such that when valve member 42 is in a first position (as shown in FIG. 6) inlet passageway 32 communicates through chamber 30 with passageway 34, and outlet passageway 38 communicates through chamber 30 with passageway 36. Thus, a fluid entering through inlet passageway 32 passes through the cut-away portion of valve member 42 in alignment therewith, through passageway 34 and into the left side of bore 12 as viewed in FIG. 6. This causes movement of piston 14 from left to right, forcing the fluid in the right side of bore 12 out through passageway 36, through the cut-away portion of valve member 42 in alignment therewith, and through outlet passageway 38. As piston 14 moves toward the right, shaft 50 contacts the right side of opening 60 and causes rotation of arm 58, as previously described. As arm 58 passes the central position of its motion spring 62 causes it to move quickly to the limit of its travel, quickly rotating shaft 46 and moving valve member 42 to a second position. In the second position of valve member 42 (FIG. 7) the cut-away portion formerly in alignment with inlet passageway 32 and passageway 34, allowing the fluid to pass from the former into the latter, is moved away from its first position and valve member 42 effectively seals these two passageways from mutual communication. Likewise, the notch formerly in alignment with passageway 36 and outlet passageway 38 moves out of alignment and allows valve member 42 to seal these two passageways. The cut-away portion now in registration with inlet passageway 32 (in the second position of valve member 42) causes it to communicate with passageway 37, and the cut-away portion in registration with outlet passageway 38 causes it to communicate with passageway 35. Fluid entering through inlet passageway 32 thus passes into chamber 30, through the cut-away portion of valve member 42 in alignment with inlet passageway 32, through passageway 37 and into the right end of bore 12 as viewed in FIG. 7. This causes movement of piston 14 from right to left, forcing the fluid in the left side of bore 12 out through passageway 35 and into chamber 30, through the cut-away portion in valve member 42 in registration with passageway 35 and out through outlet passageway 38. As piston 14 moves from right to left, shaft 50 contacts the left side of opening 60 and causes rotation of arm 58 away from the position illustrated by dotted lines in FIG. 9. Again, as arm 58 passes the central position it is quickly moved to the left limit of its travel by spring 62, rotating shaft 46 and returning valve member 42 to its first position. It is to be noted that the movement of valve member 42 between its first and second positions is essentially instantaneous, taking place during the time that arm 58 is moved from the central position of its travel into contact with either stop 64 or stop 68 under the strong bias of spring 62. Upon movement of valve member 42 from one position to the other, the fluid immediately begins to flow into the opposite end of bore 12 causing reverse motion of piston 14. Shaft 50 then traverses opening 60, contacts the opposite side thereof, and rotates arm 58 to its central position where the action of spring 62 takes over. The stroke of piston 14 is governed largely by the size and configuration of opening 60. Also, the shape of opening 60 is such that as shaft 50 moves into contact with the sides thereof it meets the sides at a slight angle, having the effect of sliding into contact with the sides rather than meeting them straight on, thus reducing wear and noise.

As previously stated the flow of fluid through inlet line 28 is governed by valve controls, the operation of which will now be described. Valve housing 100 contains a conventional one-way valve 102, best seen in FIG. 3 where it is shown in the fully closed position. Valve 102 is mounted on shaft 104 which is slidingly engaged in a guide hole 106 in top cap 108 of valve housing 100. Valve 102 is biased toward the closed position by spring 110 which encircles shaft 104. The lower side of valve 102 rests on valve lifter 112 which is interposed in the opening 114 of valve housing 100 which is sealed by valve 102. Valve lifter 112 has at its lower end a small tip 116 which rests on a function generator or continuous circular cam element 118. Cam 118 is fixedly mounted on shaft 120 for rotation therewith. One end of shaft 120 extends through cap 122 which is threaded into one side of housing 124 to seal the end thereof. Mounted for free rotation on the portion of shaft 120 which extends outside housing 124 is a control lever or actuator arm 126. Extending outwardly from different sides of the lower portion of actuator arm 126 are three ears, 128, 130 and 132. Fixedly mounted on shaft 120 to cause rotation thereof is arm 134, which is retained on shaft 120 by collar 136. A short contact element 138 is freely rotatable on pin 140 on the lower end of arm 134. Extending through a hole 142 in the upper portion of actuator arm 126 is a control wire 144 which has adjustable stops 146 and 148 mounted thereon. Control wire 144 may be enclosed in the usual protective flexible cable 149 (FIG. 1) and extend to a convenient location for manipulation by the operator of the mechanism. The end of control wire 144 to be moved (not shown) may terminate in the usual control button or other element which may be mounted, as on the dash panel of a vehicle, to move in any manner desired for imparting motion to control wire 144 and thence to actuator arm 126. Movement of control wire 144 toward the right as viewed in FIG. 8 will bring stop 146 into contact with actuator arm 126 and cause clockwise rotation thereof. When ear 132 contacts arm 134 to cause rotation thereof shaft 120 is also rotated due to the fixed mounting of arm 134 thereon. Since cam 118 is also fixedly mounted on shaft 120 it is also rotated. As may be seen from FIG. 2 when cam 118 is rotated in a clockwise direction the rise of the cam causes valve lifter 112 to rise, thus opening valve 102. The farther cam 118 is rotated in a clockwise direction as viewed in FIG. 2, the farther valve lifter 112 will be raised and the wider valve 102 will be opened. The configuration of valve lifter 112 is such that when valve 102 is open fluid may flow through opening 114 without being completely obstructed by valve lifter 112. Wider opening of valve 102 will allow a faster rate of flow of a fluid under relatively constant pressure supplied from inlet line 28. Movement of control wire 144 to rotate actuator arm 126, arm 134 and cam 118 controls the opening of valve 102, the rate of flow of the fluid, and hence the speed of operation of the reciprocating mechanism.

As stated at the outset, it is desirable in some applications of reciprocating mechanism that the elements return to a predetermined initial position when motion is stopped. From the foregoing description it may be seen that the reciprocating motion of piston 14 will stop as soon as valve 102 is closed, stopping the flow of fluid to bore 12. Provision is therefore made to allow valve 102 to be fully closed only when the elements of the apparatus are at a predetermined position, in the illustrated embodiment that of the rightmost position of piston 14 and the associated elements as seen in FIG. 8.

To illustrate how this function is accomplished, the operation of the control mechanism from the fully closed position of valve 102 to the fully open position thereof and back to the fully closed position will be described. When the elements are in the position indicated by dotted lines in FIG. 9, valve 102 is fully closed. In order to move valve 102 toward the open position to set the apparatus in motion, control wire 144 is moved to rotate actuator arm 126 in a clockwise direction. Rotation of actuator arm 126 causes ear 130 to rotate contact element 138 clockwise until the right side of arm 134 is contacted by ear 132. Arm 134 is then rotated along with actuator arm 126, thus rotating shaft 120 and cam 118, and contact element 138 clears pin 90. Valve 102 is now open, as previously described, and piston 14 and the elements associated therewith begin reciprocating motion. Movement of control wire 144 to rotate actuator arm 126 and arm 134 to the position of FIG. 8 opens valve 102 to its fullest extent, causing piston 14 to reciprocate at maximum speed. In order to stop the motion of piston 14 control wire 144 is moved from right to left to cause rotation of actuator arm 126 in a counter-clockwise direction. As actuator arm 126 begins to move in a counter-clockwise direction, contact element 138 drops into sliding engagement with guide member 150 and arm 134 does not rotate until one side thereof is contacted by ear 128 on actuator arm 126. Continued movement of actuator arm 126 causes further rotation of arm 134, shaft 120 and cam 118 to begin movement of valve 102 toward the closed position under the bias of spring 110. Contact element 138 remains in sliding contact with guide member 150. Just before contact element 138 drops off guide member 150, as shown in solid lines in FIG. 9, piston 14 is moving at its slowest speed. Further rotation of actuator arm 126 allows contact element 138 to be moved past the lowest point on guide member 150 at which time it is no longer prevented by guide member 150 from rotating about pin 140 in a counter-clockwise direction. As soon as it clears the lower end of guide member 150, contact element 138 drops off guide member 150 and is in the path of movement of pin 90 on arm 58. Movement of arm 58 from the right to the left position of FIG. 9 causes pin 90 to rotate contact element 138 in a clockwise direction about pin 140 without effect on the other elements. However, when arm 58 is moved from the left to the right position pin 90 hits contact element 138 while being moved quickly under the bias of spring 62 and causes contact element 138 to contact ear 130, resulting in further rotation of actuator arm 126 and arm 134 in a counter-clockwise direction. The final impulse given contact element 138 by pin 90 by movement of arm 58 to a predetermined position results in the full closure of valve 102 and stops the motion of piston 14.

Any convenient stop means previously known in the art may be included to limit the movement of control wire 144 by the operator so that when wire 144 has been moved to rotate actuator arm 126 as far as possible in a counter-clockwise direction, valve 102 still remains slightly open. Thus, piston 14 will continue to move until valve 102 has been completely closed by the above-described action of pin 90 and contact element 138. The elements of the mechanism will always be at a predetermined reference position when the apparatus is not in operation irrespective of their positions at the time that the operator moves control wire 144 as far as possible toward the "off" position.

Referring again to FIG. 1, the apparatus is seen from the opposite side as that shown in FIGS. 8 and 9. The end of shaft 54 may be seen extending through slot 56 in base 10, and thence through a second slot 152 in arm 154 which is pivotally mounted at 156 upon a lower portion of base 10. Two conventional vehicle windshield wiper blades 158 and 160, pivotally mounted at 162 and 164 respectively, are connected by rods 166 and 168 to arm 154 on opposite sides of pivotal mounting 156. As piston 14 reciprocates back and forth shaft 54 will reciprocally rotate arm 154, resulting in the reciprocating arcuate motion of wiper blades 158 and 160. The previously described means for moving valve member 142 between first and second positions in a substantially instantaneous manner results in continuous, automatic and uniform reciprocating motion of wiper blades 158 and 160. The speed of movement may be continuously adjusted in a simple manner through the use of the cam-lifted valve and elements associated therewith. Also, the elements stop each time in the same position through action of the elements of the apparatus themselves to effect full closure of a valve.

Since certain changes may be made in the above-described apparatus without departing from the scope of the invention herein involved, it is intended that all descriptive matter be interpreted in an illustrative rather than a limiting sense.

Some changes may be made in the construction and arrangement of my fluid actuated reciprocating mechanism and controls therefor without departing from the real spirit and purpose of my invention, and it is my intention to cover by my claims, any modified forms of structure or use of mechanical equivalents which may be reasonably included within their scope.

I claim:
1. A fluid pressure actuated reciprocating mechanism comprising in combination:
 (a) a housing having a hollow bore therein,
 (b) a slot in said housing communicating with said bore,
 (c) a piston reciprocably movable in said bore,
 (d) a first member fixedly attached to said piston and extending radially therefrom through said slot,
 (e) a valve chamber in said housing communicating with inlet and outlet means for a fluid under pressure,
 (f) first and second passageways in said housing, each communicating at one end with said bore and at the other end with said valve chamber,
 (g) a valve member rotatably mounted within said valve chamber for movement between a first position, wherein said first passageway communicates with said inlet means and said second passageway communicates with said outlet means, and a second position, wherein said second passageway communicates with said inlet means and said first passageway communicates with said outlet means,
(h) a pivotally mounted toggle arm having an opening therein through which said first member extends,
(i) a rotatable member to which said toggle arm is pivotally mounted in operative engagement with a portion of said toggle arm for rotation in response to movement of said toggle arm by said first member,
(j) a spring mounted at one of its ends upon a portion of said toggle arm and at the other upon a portion of said rotatable member whereby after movement of said toggle arm to a predetermined position by said first member said toggle arm is tripped by said spring, and
(k) a second member operatively connected to said valve member and movable in response to tripping of said toggle arm to cause movement of said valve member between said first and second positions.

2. A fluid pressure actuated reciprocating mechanism according to claim 1 wherein the operative engagement between said rotatable member and said toggle arm comprises meshing gear teeth on at least portions of the peripheries of both said rotatable member and said toggle arm.

3. A fluid pressure actuated reciprocating mechanism comprising in combination:
(a) a housing having a hollow bore therein,
(b) at least one piston reciprocably movable in said bore,
(c) means for supplying a fluid to said bore to cause reciprocating movement of said piston,
(d) a valve interposed in the path of said fluid and movable to a fully closed position to stop the flow of said fluid, and away from said fully closed position to control the rate of flow of said fluid,
(e) a circular cam element fixedly mounted on a shaft for rotation in response to rotary movement of said shaft,
(f) a spring urging said valve toward said fully closed position and into slidable engagement with the cam surface of said cam element,
(g) a control lever fixedly mounted on said shaft whereby said cam element is rotated in response to rotary movement of said control lever,
(h) stop means defining the limits of movement of said control lever, and so constructed and arranged that movement of said control lever to cause movement of said valve toward said fully closed position is limited by said stop means to prevent further movement of said control lever before said valve is in said fully closed position, and
(i) means associated with said piston adapted to move said valve to said fully closed position after movement of said control lever to cause movement of said valve toward said fully closed position.

4. A fluid pressure actuated reciprocating mechanism comprising, in combination:
(a) a housing having a hollow bore therein,
(b) at least one piston reciprocably movable in said bore,
(c) means for supplying a fluid to said bore to cause reciprocating movement of said piston,
(d) a valve interposed in the path of said fluid and movable to a fully closed position to stop the flow of said fluid, and away from said fully closed position to control the rate of flow of said fluid,
(e) a circular cam element fixedly mounted on a shaft for rotation in response to rotary movement of said shaft,
(f) a spring urging said valve toward said fully closed position and into slidable engagement with the cam surface of said cam element,
(g) a manually movable control lever fixedly mounted on said shaft whereby said cam element is rotated to cause movement of said valve in response to manual movement of said control lever,
(h) stop means defining the limits of manual movement of said control lever and so constructed and arranged that the limit of said manual movement is reached in moving said valve toward the closed position before said fully closed position is reached,
(i) a second lever pivotally mounted on said shaft for substantially free rotation thereabout and movable to contact a portion of said control lever to cause movement thereof, and
(j) means associated with said piston adapted to contact said second lever when said limit of said manual movement is reached in moving said valve toward the closed position, whereby said second lever is caused to move said control lever beyond said limit of said manual movement and said valve is moved to said fully closed position.

5. A fluid pressure actuated reciprocating mechanism comprising, in combination:
(a) a housing having a hollow bore therein,
(b) at least one piston reciprocably movable in said bore,
(c) at least one passageway in said housing communicating with said bore,
(d) a valve member movable between first and second positions and so constructed and arranged that when in said first position said passageway communicates therethrough with a source of fluid under pressure, and when in said second position said passageway communicates with means for discharging said fluid from said housing, whereby said piston is moved by said fluid in a first direction when said valve means is in said first position and in a second direction when said valve means is in said second position,
(e) spring loaded toggle means movable by movement of said piston to a predetermined position wherein said toggle means is tripped by the spring loading thereon,
(f) a valve interposed in the path of said fluid and movable to a fully closed position to stop the flow of said fluid, and away from said fully closed position to control the rate of flow of said fluid,
(g) a circular cam element fixedly mounted on a shaft for rotation in response to rotary movement of said shaft,
(h) a spring urging said valve toward said fully closed position and into slidable engagement with the cam surface of said cam element,
(i) a manually movable control lever fixedly mounted on said shaft whereby said cam element is rotated to cause movement of said valve in response to manual movement of said control lever,
(j) stop means defining the limits of manual movement of said control lever and so constructed and arranged that the limit of said manual movement is reached in moving said valve toward the closed position before said fully closed position is reached,
(k) a second lever pivotally mounted on said shaft for substantially free rotation thereabout and movable to contact a portion of said control lever to cause movement thereof, and
(l) said toggle means having a portion which contacts said second lever upon tripping of said toggle means after movement of said control lever in moving said valve toward the closed position, whereby said second lever is caused by said portion to move said control lever beyond said limit of said manual movement and said valve is moved to said fully closed position.

(References on following page)

References Cited in the file of this patent

UNITED STATES PATENTS

| | | |
|---|---|---|
| 1,766,988 | Farr | June 24, 1930 |
| 1,871,758 | Stevens | Aug. 16, 1932 |
| 1,912,994 | Oishei et al. | June 6, 1933 |
| 2,408,006 | Smith | Sept. 24, 1946 |
| 2,584,229 | Sacchini | Feb. 5, 1952 |
| 2,616,400 | Sprague et al. | Nov. 4, 1952 |
| 2,621,634 | Carey | Dec. 16, 1952 |
| 2,674,233 | Sprague et al. | Apr. 6, 1954 |
| 2,697,419 | Krohm | Dec. 21, 1954 |
| 2,698,608 | Milner et al. | Jan. 4, 1955 |
| 2,731,954 | O'Shei | Jan. 24, 1956 |
| 2,945,480 | Toman | July 19, 1960 |
| 2,980,064 | Norton et al. | Apr. 18, 1961 |
| 3,079,122 | Schneider | Feb. 26, 1963 |